United States Patent Office 3,055,752
Patented Sept. 25, 1962

3,055,752
STEEL ALLOY
Joseph L. Bash, P.O. Box 51, Port Reading, N.J.
No Drawing. Filed July 27, 1960, Ser. No. 45,542
2 Claims. (Cl. 75—.5)

This invention relates to metallurgy, and more particularly, to an additive for producing tool steel from scrap metal. This application is a continuation-in-part of my co-pending application, Serial No. 705,097, filed December 26, 1957, for Steel Alloy, and now abandoned.

Various attempts have been made to economically and efficiently produce better grades of machine and tool steel from low quality scrap metal. In many instances, there is little control over the analysis of the finished steel in view of the undetermined quantities of various elements in the scrap metal. It is therefore an object of the present invention to provide an addition agent for facilitating the production of better grades of steel from scrap metal that includes readily available components which may be added in a single step during the melting of the scrap metal.

Another object of the present invention is to provide a scavenger additive agent for improving the quality of steel produced from scrap metal which may be added in bulk to the metal at a predetermined temperature in a simple and efficient manner without interfering with the ordinary production methods.

With these and still further objects and advantages of this invention in mind, a scavenger additive agent of the type described has been provided that consists of the following elements having the stated relative percentage proportions, by weight:

| | Percent |
|---|---|
| Carbon | 0.16 |
| Manganese | 0.84 |
| Phosphorous | 0.012 |
| Sulphur | 0.024 |
| Silicon | 0.28 |
| Nickel | 3.37 |
| Chromium | 1.21 |
| Molybdenum | 0.12 |
| Boron | 0.14 |
| Inert matter | Balance of agent |

All of these elements are readily pulverized so that they may be thoroughly mixed together in bulk form, whereby they may be added to the melt in a single step. This scavenger additive agent is added in the ratio of one part for each ten parts of scrap metal so as to combine with the scrap metal and result in the following analysis after melting with the scavenger additive agent:

| | Percent |
|---|---|
| Carbon | 1.15 |
| Manganese | 0.86 |
| Phosphorous | 0.014 |
| Sulphur | 0.33 |
| Silicon | 0.30 |
| Nickel | 3.54 |
| Chromium | 1.26 |
| Molybdenum | 0.12 |
| Boron | 0.14 |
| Inert matter | Balance of mix |

It has been found that this scavenger additive agent is best added at a time when the scrap metal is in liquid form at slightly over 2700° F., to eliminate as many of the impurities as possible and to assure the uniform distribution of the agent throughout the scrap metal mass.

Of course, the term "scrap metal" includes such constituents as scrap steel, tin cans, and the like. Of course, the analysis will vary with the particular type of scrap material used, but will not adversely affect the results attained thereby. In the same respect, slight variations may be made in the particular relative proportion of the stated components of the scavenger addition agent depending upon the particular toughness, hardness, and strength of the steel that is sought. In any event, this scavenger additive agent produces a grade of steel that has excellent strength characteristics as compared to the characteristics of any steel that might be produced from the same type of scrap without this additive agent. It should be readily understood that the term "inert material" as used herein, is to be construed in its normal accepted meaning as denoting material that does not enter into the reaction which results in purification of the scrap material.

Thus, while slight changes can be made in the suggested composition of the scavenger additive agent, it shall be understood that such minor changes shall be within the spirit and scope of the present invention as defined by the appended claims.

Having thus described my invention, I claim as new and desire to secure by Letters Patent:

1. A scavenger addition agent for producing steel from scrap metal consisting of: 0.16% carbon, 0.84% manganese, 0.12% phosphorous, 0.024% sulphur, 0.28% silicon, 3.37% nickel, 1.21% chromium, 0.12% molybdenum and 0.14% boron, all by weight, the balance of said agent consisting of inert material.

2. A scavenger addition agent for converting scrap metal to tool steel consisting of: 0.16% carbon, 0.84% manganese, 0.012% phosphorous, 0.024% sulphur, 0.28% silicon, 3.37% nickel, 1.21% chromium, 0.12% molybdenum, 0.14% boron, all of said components being mixed together in powder form with an inert carrier constituting the balance of the agent for addition to melted scrap metal at a temperature of over 2700° F.

References Cited in the file of this patent

UNITED STATES PATENTS 2,778,079 Carney et al. _____ Jan. 22, 1957